United States Patent [19]
Egi

[11] 3,872,782
[45] Mar. 25, 1975

[54] AUTOMATIC COFFEE-MAKING MACHINE
[76] Inventor: Mario Egi, 5, Via Omboni, 20129 Milan, Italy
[22] Filed: May 17, 1973
[21] Appl. No.: 361,325

[30] Foreign Application Priority Data
May 19, 1972  Italy .................................. 24588/72

[52] U.S. Cl. ............................................. 99/289
[51] Int. Cl. ............................................. A47j 31/00
[58] Field of Search .............. 99/289, 280, 281–283, 99/299–302

[56] References Cited
UNITED STATES PATENTS
| | | | |
|---|---|---|---|
| 2,943,556 | 7/1960 | Egi | 99/289 |
| 3,593,649 | 7/1971 | Novi | 99/289 |

FOREIGN PATENTS OR APPLICATIONS
855,931   12/1960   United Kingdom ............. 99/289

Primary Examiner—Harvey C. Hornsby
Attorney, Agent, or Firm—Michael S. Striker

[57] ABSTRACT

The machine comprises a casing wherein a rotor is enclosed and rotatably supported for stepwise rotation to sequentially carrying coffee-making cavities in said rotor at a plurality of stations, one working station including a perforated diaphragm for beverage percolation therethrough. The rotor has a spherical outer face and the diaphragm is a spherical bowl mating said face. The rotor includes further passages arranged to provide short blasts of pressurized water on said diaphragm for fully cleaning same just after each coffee-making step during the rotation following such step.

4 Claims, 4 Drawing Figures

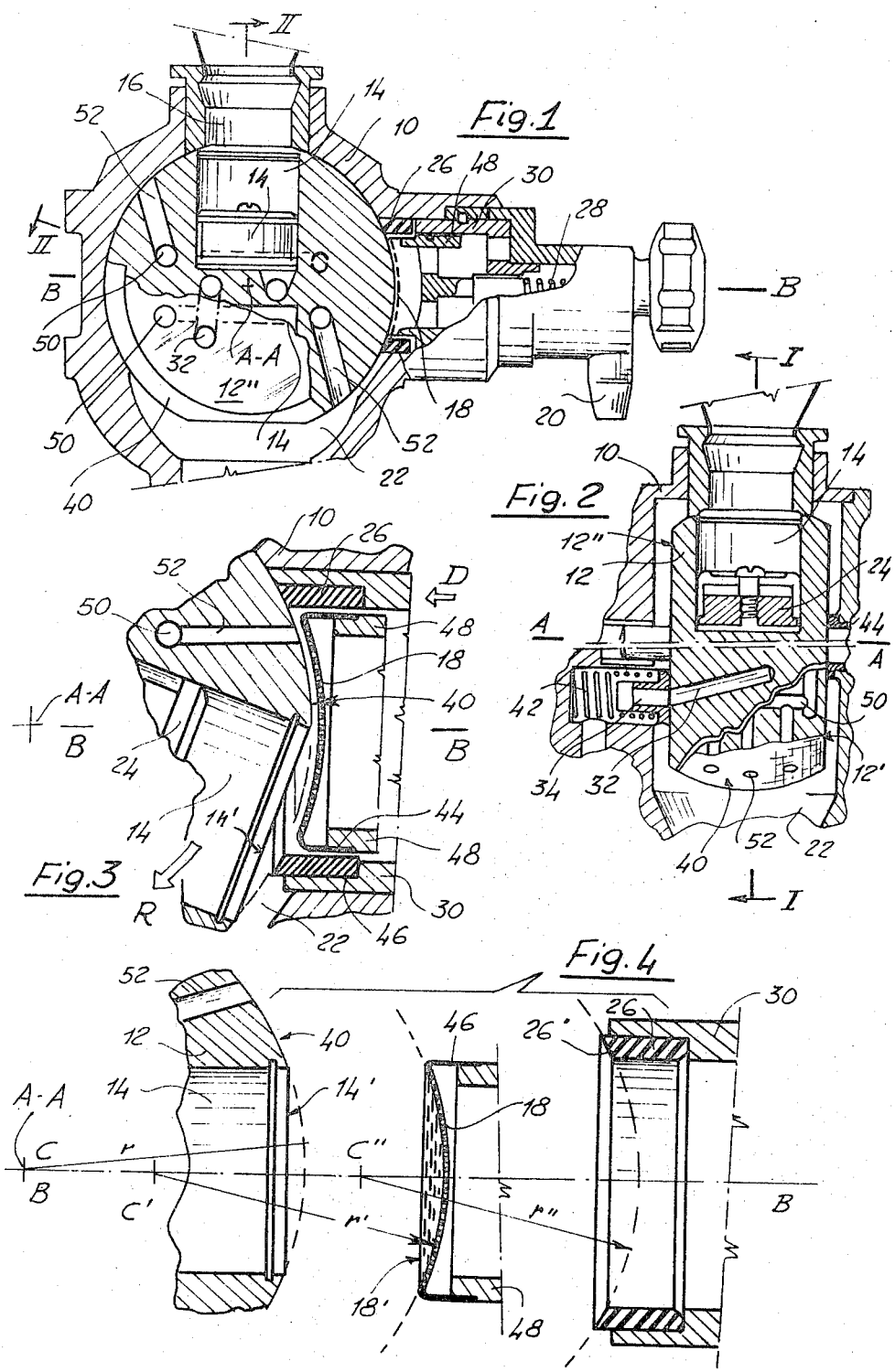

3,872,782

AUTOMATIC COFFEE-MAKING MACHINE

BACKGROUND OF THE INVENTION

1. The Field of the Invention

This invention is concerned with coffee-making machines and more specifically with a coffee-making apparatus or unit of the kind comprising a stationary casing wherein a drum-like rotor is supported for intermittent rotation about a horizontal axis, said rotor having a plurality of circumferentially spaced coffee-making cavities open at the outer surface of the rotor for consecutive indexing alignment with a plurality of working stations, one of which arranged for coffee-making.

2. The Prior Art

Such machines and units are well known and widely experienced and therefore a further detailed discussion herein is not deemed necessary, except as the scope, feature and advantages of the invention are concerned with. More detailed informations about coffee-making machines of the kind referred to above can be had from the disclosure of the prior U.S. Pat. Nos. 2,943,556, and 3,593,649 granted to same Applicant and another co-inventor, reference being herein made to FIG. 2 and respectively to FIGS. 2 and 6 of said prior Patents, wherein a rotor of such kind has been illustrated.

According to said known arrangement, the rotor is intermittently driven so that each coffee-making cavity will be sequentially co-axially indexed with a downturned passage formed in the casing and through which a metered amount of ground coffee is caused to fall into the cavity, then faced to a perforated curved wall, adjacent to and matching with the drum outer surface, and further then co-axially aligned with a downwardly directed exhaust duct. The beverage is produced by supplying hot pressurized water at the deepest end of the cavity which has been positioned in face of said perforated curved wall. The water is forced to permeate the layer or "filter" of coffee, preliminarily loaded into said cavity and the beverage percolates through said wall, which is impervious to the ground coffee. When the coffee-making step has been completed, a further rotational step of the rotor carries the exhausted coffee, which has assumed the status of a granulated but dense and coherent cake, above the exhaust duct inlet where said cake is expelled by the pressure which remains into same cavity.

Such type of machines is advantageous and in demand. When compared with other types of heretofore proposed and manufactured automatic coffee-markes, the various advantages of such type of machines are evident. The machines provided with a rotor supported about a horizontal axis and having radially arranged and circumferentially spaced cavities, as above, are of simple and sturdy construction, resist to careless servicing and require a minimum of maintenance for proper operation. The art of such machines is a well worked one and exceedingly simple but efficient machines have been manufactured and resist to most extended service.

On the other part, these machine are subject to some objections. The coffee-making cavities are cylindrical and their axes lie in a plane perpendicular to the axis of the rotor, the outer surface of which is cylindrical too, but co-axially to the latter axis, and the perforated wall is curved to form a part of a cylindrical surface which adjacently matches the cylinder embodied by the outer surface of the rotor, in which the said cavities open. When a cavity is positioned at the coffee-making station, that is in face to the curved perforated wall, which actually acts as the bottom of the space in which the ground coffee is pressed by the water which percolates therethrough, the pressed layer of coffee will not be of uniform thickness at any location about its axis (the axis of the cavity). A somewhat irregularity might be encountered in the percolation, because the pressurized water can find some preferred paths of minor resistance in forcing its way through the layer of the coffee.

Additionally, the perforated curved wall is supported in close proximity with the outer or peripheral surface of the rotor, but any actual contact with such rotor cannot be provided. Therefore, after each coffee-making step some particles of coffee will remain adjacent to the inner face of such wall the perviousness to water and the efficiency of which is progressively impaired. For proper servicing of such machines, and at least daily disassembling, careful washing and re-assembling of the subassembly which includes said diaphragm forming perforated wall is strongly suggested if not imperative.

It is therefore an object to this invention to provide a new and improved coffee-making machine or unit essentially of the kind referred to above, which is not subject to the above objections and limitations and which is capable to either improve the regularity of high quality beverage percolation and to provide a steady efficient service without severe maintenance requirements.

BRIEF SUMMARY OF THE INVENTION

According to an important feature of the invention, the rotor is basically spherical or, it consists of a spherical zone having symmetrical flat side faces spaced from its greatest circle perpendicular to the axis of same rotor, and its coffee-making cavities open in the spherical zone which forms the peripherical face of the rotor, forming perfect planar circles at their outlets, by the intersection of the cylindrical wall of such cavities, co-axial to radii of the sphere, intersecting said greatest circle. The perforated diaphragm has therefore, for matching the spherical outer face of the rotor, the form of a spherical bowl having a planar circular periphery dimensioned to mate with the outlet of the facing cavity and co-axial therewith. As a consequence of this novel geometry of the rotor and of the diaphragm, the pressed layer of the coffee, within the cavity, will have a shape which is quite uniform about its axis, namely the shape of a flat disk having a shallow dome shaped end face.

According to another important feature of the invention, the conventional passages, provided for supplying hot pressurized water in the deepest part of the cavity positioned at the working station, for producing the beverage, are complemented by further passages having their inlets on a flank of the rotor, positioned for transiliently and shortly indexing the outlet of the supply passage, conventionally provided in the casing for supplying the cavity in its working station, when the rotor is being rotated but when the outlet of the cavity (wherein a beverage has just been produced) has not completely cleared the diaphragm, and their outlets on the peripheral surface of the rotor, near to the said cavity outlet and positioned to face the part of the diaphragm which has been already cleared by the cavity. Upon such provision, a very brief but powerful blast of pressurized hot water will issue such outlets and impinge on the inner face of the diaphragm, to completely clean such face and diaphragm and its tiny openings, and then repelled (except the minor amount which has passed through said tiny openings) in the inlet of the cavity opening, to impinge the pressed cake of coffee on its outer face, to break it into pieces and to expedite its exhaustion into the exhaust duct.

These and other features, advantages and object of the invention will be made apparent as this description proceeds, reference being made to the accompanying drawing, forming an essential component of this disclosure.

THE VIEWS OF THE DRAWING

FIG. 1 is a vertical longitudinal sectional view, taken in the plane indicated at I—I in FIG. 2, with some parts in side elevation, of the preferred embodiment of the invention;

FIG. 2 is a fragmentary transversal sectional view of the machine, taken in the planes indicated at II—II in FIG. 1;

FIG. 3 is a fragmentary enlarged and detailed sectional view of the outlet portion of a cavity in which a beverage has just been made and the cleaning and washing step is on;

FIG. 4 is an exploded view of the components shown in FIG. 3, but arranged in co-axial relationship and arranged for making clear the new geometrical features of the unit.

DETAILED DESCRIPTION OF THE PREFERRED EMBODIMENT

Referring now to the drawings, there is shown a casing or stator 10 wherein a rotor 12 is supported for rotation about a horizontal axis A—A. The rotor is provided with preferably two diametrally opposed cylindrical cavities 14. The rotor is intermittently rotated in clockwise direction (as shown in the drawing) by known drive means (not shown), each rotational step causing a rotation of 90° about the axis A—A. Such step-by-step rotation carries the cavity 14, which is upwardly turned and has received a charge or load of ground coffeee, (delivered by a known metering device (not shown) above a vertical supply passage 16) in co-axial alignment with a perforated diaphragm 18, shown in FIGS. 3 and 4, and through which the beverage is caused to percolate, and then delivered off a nozzle 20. The rotor is maintained stationary until the desired amount of beverage has been prepared and delivered, and then the next rotational step will carry the same cavity above a chamber 22 provided in the lower part of the stator 10 and including the inlet of an exhaust duct through which the exhausted cakes of coffee are got rid of. In the meantime, the other opposite cavity 14 will reach the upwardly directed loading station, ready for a new cycle.

Within each cavity 14 a small piston 24 is slidably arranged, which is outwardly pushed by the pressurized water fed in the deepest part of the respective cavity, to press the loaded coffeee against the diaphragm 18, during the percolation step. Such step is promoted by the fact that one passage 32, formed into the rotor 12 and having its outlet in the deepest portion of the cavity actually located in face of the diaphragm 18, has its inlet, on the side face 12″ of the rotor, indexed with the water supply outlet 34, carried by the stator and connected to a known source (not shown) of pressurized hot water, said outlet being urged by a spring 42 against the said flank 12″ of the rotor, either for ensuring a leakless communication and for defining the axial position of the rotor into the stator, as resulting by the axial abutment of the opposite flank 12′ on an axial and radial load bearing bushing 44.

During the same coffee-making step, the outlet of the cavity which actually faces the diaphragm 18 is circumscribed by a gasket 26, to provide a leak-proof confinement of the space in which the pressure is applied for providing the percolation. Such gasket 26 is seated into a seat formed into a tubular member 30 urged by a spring 28 for ensuring the pressure tight adherence of the gasket on the outer surface of the rotor. The diaphragm 18 is at its turn supported by another member 48 at a small but proper distance from said outer surface, to prevent contact and friction between metallic parts (the diaphragm and the rotor) during the rotational steps of same rotor.

As far as the machine has been above described, it generally corresponds to current art and might be considered as being subject to the objections and limitations above analyzed.

According to the geometrical aspect of the invention, the rotor 12 has a spherical outer surface 40 having its center at C on the axis A—A about which the rotor is rotatably supported, and where such axis intersects the axis B—B of the perforated wall or diaphragm 18. Its outer surface 40 consists therefore of a spherical zone evenly sidewardly extended from a greater circle perpendicular to the axis of rotation, and the outlets of cavities open within said spherical zone, and the contour of said outlet is a quite perfectly planar circle and indicated at 14′ in FIG. 4.

At its turn, the curved perforated wall of diaphragm 18, shaped to mate with the adjacent outer surface of the rotor, has the geometry of a spherical bowl surface 18′, and its radius $r'$ is slightly greater than the radius $r$ of the spherical zone 40 of the rotor, because such diaphragm is supported, as indicated above, slightly spaced from the rotor. The space within which the coffee is pressed and percolated at the working station is therefore quite symmetrical about the axis B—B, that is the axis of the cavity in such station and of the diaphragm.

Such geometry improves also the proper adherence and fluid tight ability of the gasket 26. Such gasket is quite circular and has a front annular face 26′ of spherical configuration or radius $r''$ equal to radius $r$ of the rotor surface. The gasket can exert a perfect uniform pressure all about the cavity outlet during the percolation. Of course, the centers C′ and C″ of the spherical surfaces 18′ and 26′ are supposed to merge with the center C of the rotor outer surface 40, when the described components are properly assembled in the machine.

The service of the machine is greatly improved by the provision of complemental passages in the rotor. Such complemental passages include, relatively to each coffee-forming cavity 14, a transverse passage 50 having its inlet on said flank 12″ of the rotor, on the circle which includes the inlets of passages 32, so that such passages 50 will be transiently indexed with the supply outlet 34 while the rotor is rotated just beyond the working station of the respective cavity 14. Such passage 50 is connected with a number of outlet passages 52 extended to open on the outer surface 40 of the rotor, at brief distance from the related cavity outlet, as shown in FIG. 3, so that the outlets of such passages 52 will face the diaphragm 18 well before the outlet of the cavity has cleared such diaphragm, during the rotational step, in direction R, following the percolation step.

During such rotation a very brief communication will occur between the outlet 34 (at which the pressurized hot water is constantly applied) and the transverse passage. During such brief occurrence, a short but powerful blast of pressurized water will be issued from the outlet passages 52 to impinge on and flow along the inner face of the diaphragm 18, sweeping therefrom any residual coffee and cleaning all tiny openings thereof, this most desirable action occurring just after the completion of any coffee-making step. A minor and not noticeable amount of water will percolate through the diaphragm 18, completely cleaning the same, while the major part of the blast will be deviated by such diaphragm and returned into the outlet of the cavity (which has not cleared the said diaphragm, as shown in FIG. 3) to impinge on the cake of exhausted coffee (not shown) broking it into pieces, facilitating its discharge into the exhaust duct 22, and finally throughoutly cleaning the cavity.

While I have shown and described certain embodiments of my invention, it is to be understood that it is capable of many modifications, changes, therefore, in the construction and arrangement may be made without departing from the spirit and scope of the invention as defined in the appended claims.

I claim:

1. An automatic coffee-making apparatus of the kind described, comprising a stationary casing having an inner cylindrical surface defining a cylindrical chamber having a ground coffee inlet at a first station, a screened beverage outlet including a substantially bowl-shaped liquid-permeable diaphragm at a second station circumferentially spaced from said first station, a used coffee discharge outlet at a third station circumferentially spaced from said second station and located diametrically opposite to said first station, and pressurized hot water supply means located transversely of said first station; a cylindrical drum rotor having an outer surface sealingly engaging said inner cylindrical surface of said stationary casing and formed with a plurality of coffee-making cylindrical cavities extending radially inwardly from said outer surface, and having a passage means containing a first opening, a second opening, an outlet passage, and a transverse passage, said outlet passage communicating with said first opening located on said outer surface of the rotor and extending inwardly therefrom, and said transverse passage communicating with said outlet passage and with said second opening on said outer surface of the rotor, said rotor being stepwise rotatable about an axis of said cylindrical chamber for consecutive indexing alignment of said cavities and said passage means with said stations and said hot water supply outlet, respectively; and drive means operatively connected to said rotor for rotating the same, when actuated, through a stepped cycle of rotation in which after a cavity has been indexed at said second station and has begun to be initiated towards said third station, said second opening on said rotor is indexed with said hot water supply means so as to permit a brief blast of pressurized hot water to issue from said first opening after passing through said transverse passage and said outlet passage and impinge on said bowl-shaped liquid-permeable diaphragm for sweeping residual ground coffee therefrom.

2. An automatic coffee-making apparatus of the kind described, comprising a stationary casing having an inner cylindrical surface defining a cylindrical chamber having a ground coffee inlet at a first station, a screened beverage outlet including a substantially bowl-shaped liquid-permeable diaphragm at a second station circumferentially spaced from said first station, a used coffee discharge outlet at a third station circumferentially spaced from said second station located diametrically opposite said first station, and pressurized hot water supply means located transversely of said first station having a stationary supply inlet located on said inner cylindrical surface and biasing means urging said supply inlet inwardly of said cylindrical chamber; a cylindrical drum rotor having an outer surface sealingly engaging said inner cylindrical surface of said stationary casing and formed with a plurality of coffee-making cylindrical cavities extending radially inwardly from said outer surface, and having at least two passage means, said first passage means containing a first opening, a second opening, an outlet passage and a transverse passage, said outlet passage communicating with said first opening located on said outer surface of the rotor and extending inwardly therefrom, and said transverse passage communicating with said outlet passage and with said second opening on said outer surface of the rotor, said second passage means being a hot water passage communicating with said stationary supply inlet by said biasing means and extending inwardly from said outer surface of the rotor into the deepest portion of said cavities, said rotor being stepwise rotatable about an axis of said cylindrical chamber for consecutive indexing alignment of said cavities, said first passage means, and said second passage means with said hot water supply outlet means, respectively; and drive means operatively connected to said rotor for rotating the same, when actuated, through a stepped cycle of rotation on which a cavity being indexed at said second station is delivered hot pressurized water via said second passage means and in which after a cavity has been indexed at said second station and has begun to be initiated towards said third station said second opening on said rotor is indexed with said hot water supply means so as to permit a brief blast of pressurized hot water to issue from said first opening after passing through said transverse passage and said outlet passage and impinge on said bowl-shaped liquid-permeable diaphragm for sweeping residual ground coffee therefrom.

3. An automatic coffee-making apparatus of the kind described, comprising a stationary casing having an inner cylindrical surface defining a cylindrical chamber having a ground coffee inlet at a first station, a screened beverage outlet including a substantially bowl-shaped liquid-permeable diaphragm at a second station circumferentially spaced from said first station, a used coffee discharge outlet at a third station circumferentially spaced from said second station located diametrically opposite said first station, and pressurized hot water supply means located transversely of said first station having a stationary supply inlet located on said inner cylindrical surface and biasing means uring said supply inlet inwardly of said cylindrical chamber; a cylindrical drum rotor having an outer surface sealingly engaging said inner cylindrical surface of said stationary casing and formed with a plurality of coffee-making cylindrical cavities extending radially inwardly from said outer surface, and having at least two passage means, said first passage means containing a first opening, a second opening, an outlet passage and a transverse passage, said outlet passage communicating with said first opening located on said outer surface of the rotor and extending inwardly therefrom, and said transverse passage communicating with said outlet passage and with said second opening on said outer surface of the rotor, said second passage means being a hot water passage communicating with said stationary supply inlet by said biasing means and extending inwardly from said outer surface of the rotor into the deepest portion of said cavities, said rotor being stepwise rotatable about an axis of said cylindrical chamber for consecutive indexing alignment of said cavities, said first passage means, and said second passage means with said hot water supply outlet means, respectively; and drive means operatively connected to said rotor for rotating the same, when actuated, through a stepped cycle of rotation on which a cavity being indexed at said second station is delivered hot pressurized water via said second passage means and in which after a cavity has been indexed at said second station and has begun to be initiated towards said third station said second opening on said rotor is indexed with said hot water supply means so as to permit a brief blast of pressurized hot water to issue from said first opening after passing through said transverse passage and said outlet passage and impinge on said bowl-shaped liquid-permeable diaphragm for sweeping residual ground coffee therefrom, said blast being then deflected by said diaphragm into said cavity impinging the outer surface of the residual ground coffee cake in said cavity for disgregating said cake therefrom.

4. The automatic coffee-making machine as defined in claim 1 and having an annular gasket supported in said stationary casing and positioned for circumferentially confining the screened diaphragm and the outlet of the coffee-making cavity indexed with said diaphragm in said second station, said gasket being urged against said rotor outer surface to provide a running seal on said surface and making leak-proof the space wherein the beverage pressure percolation is performed, wherein the said annular gasket has an edge annular face positioned to adherently mate with the rotor.

* * * * *